March 4, 1941. T. A. BOWERS 2,233,579
FABRICATED PACKING
Filed March 26, 1938 4 Sheets-Sheet 1
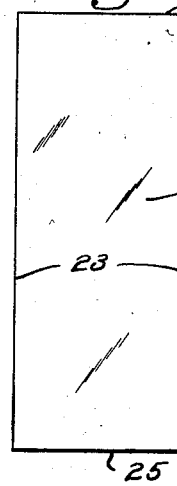
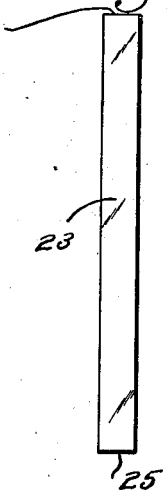
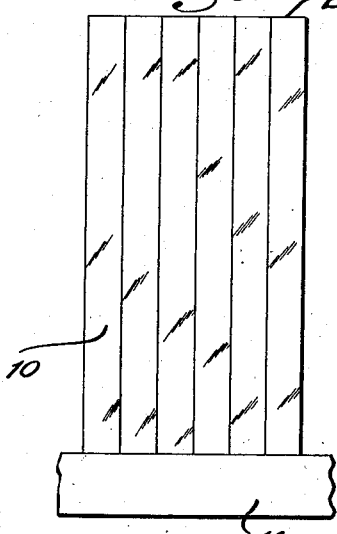
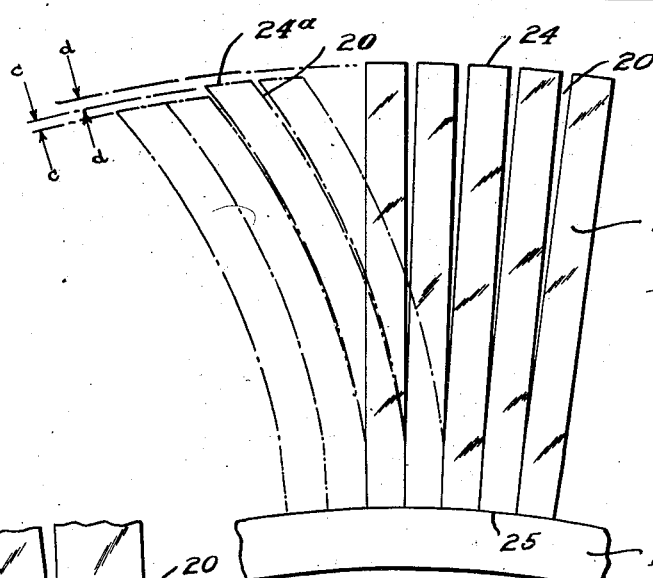
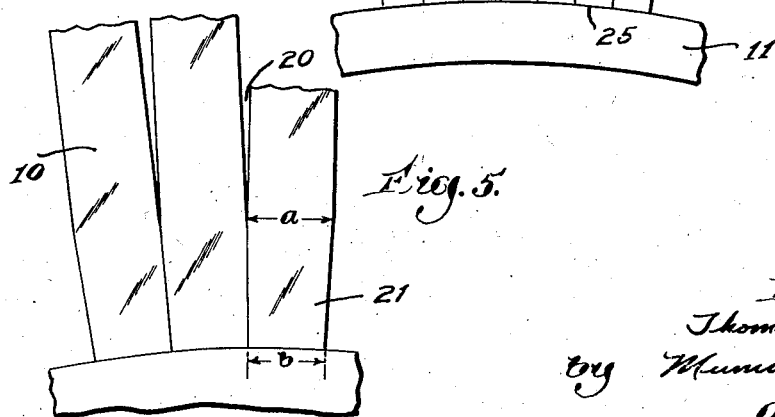
Inventor
Thomas A. Bowers
by Murdock H. Hamilton
attorney March 4, 1941.  T. A. BOWERS  2,233,579
FABRICATED PACKING
Filed March 26, 1938  4 Sheets-Sheet 2
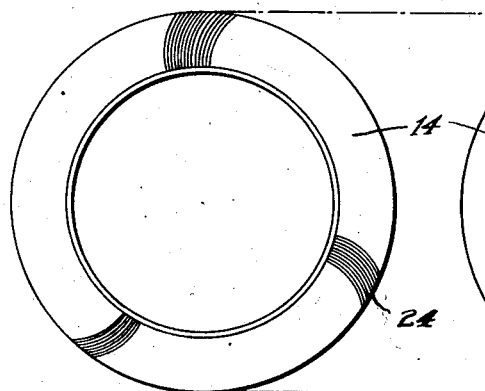
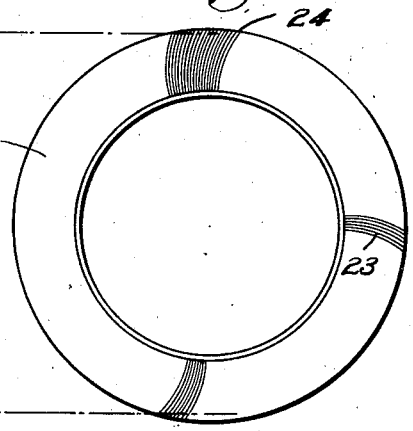
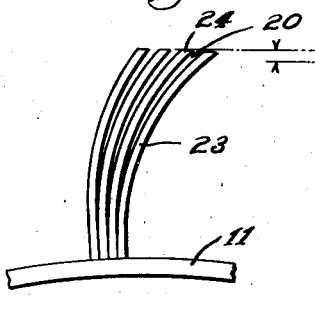
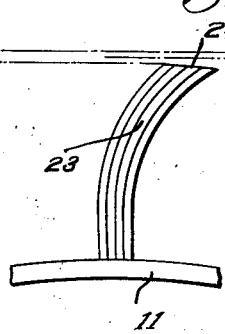
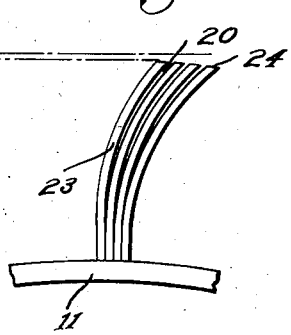
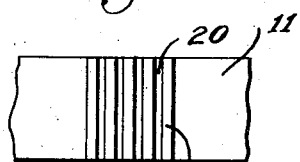
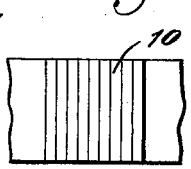
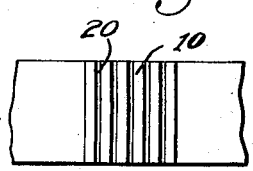
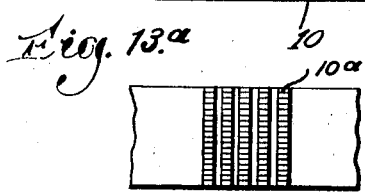
Inventor
Thomas A. Bowers
by Munroe K. Hamilton
Attorney

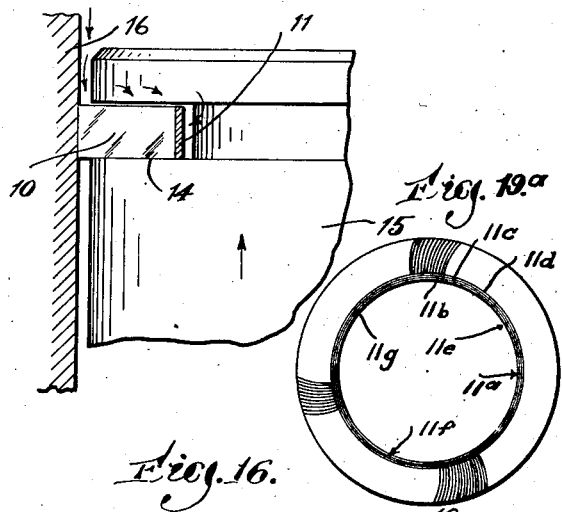
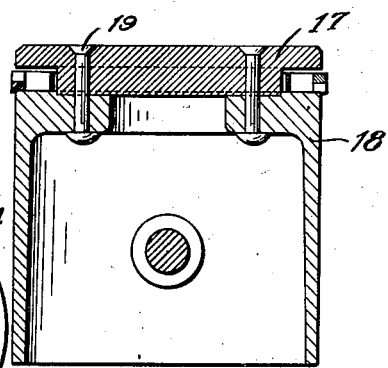
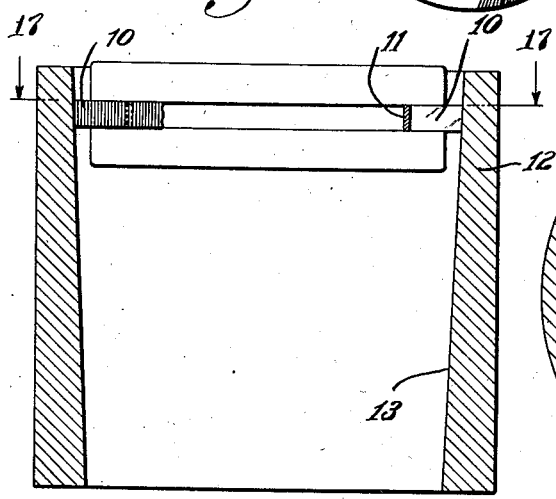
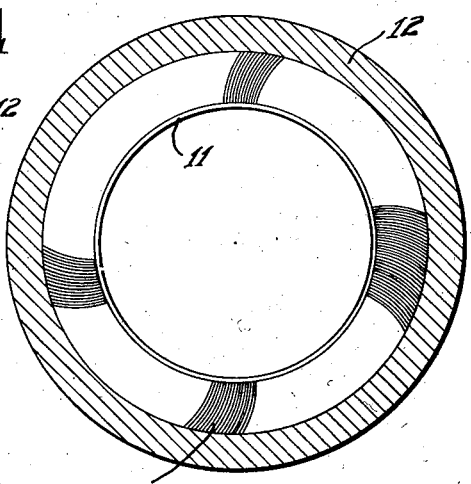
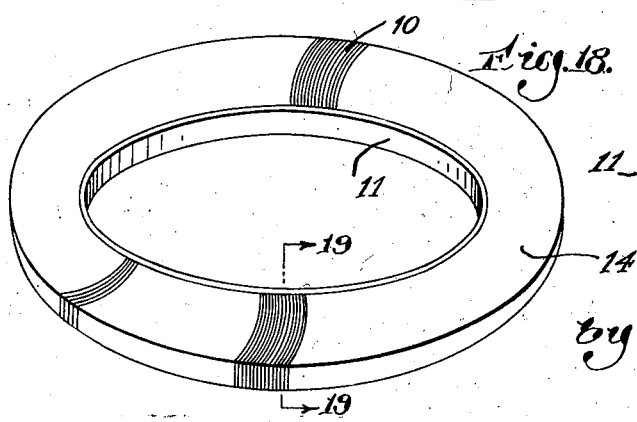
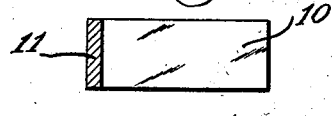

March 4, 1941. T. A. BOWERS 2,233,579
FABRICATED PACKING
Filed March 26, 1938 4 Sheets-Sheet 4
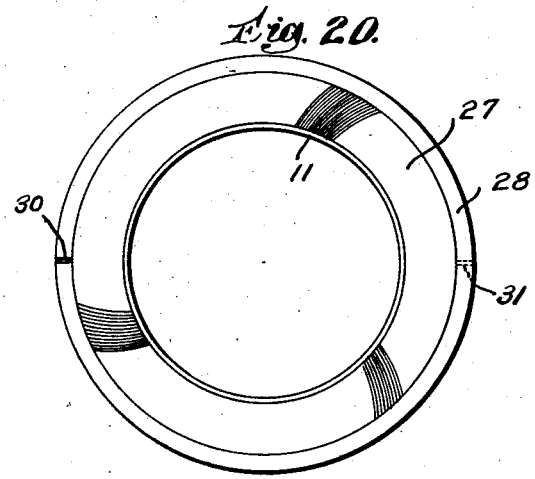
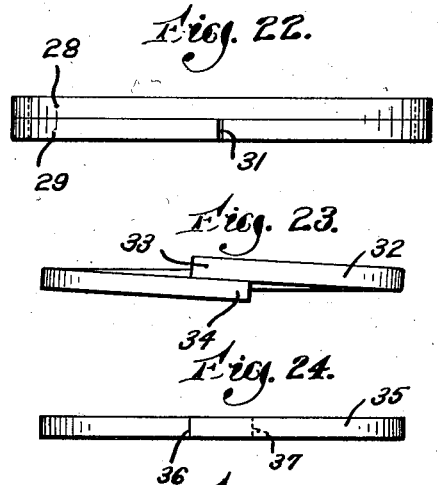
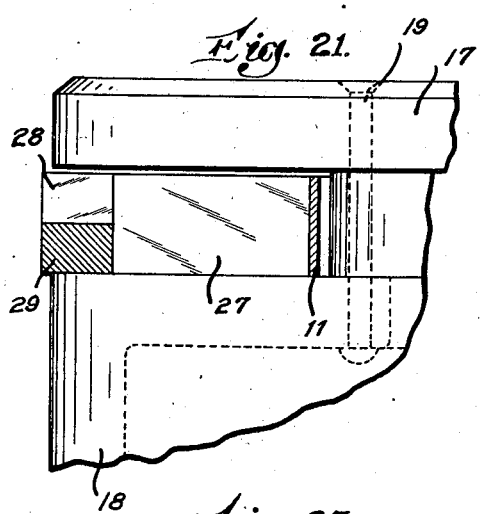
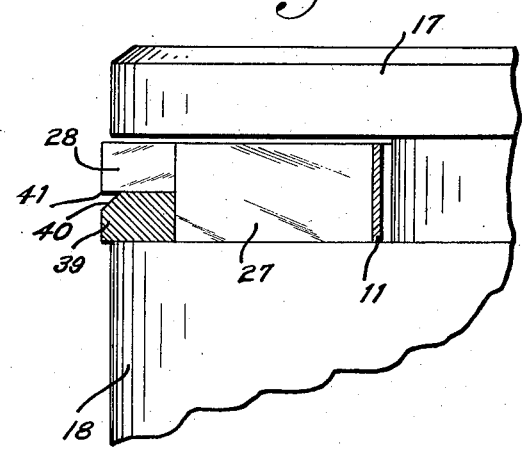
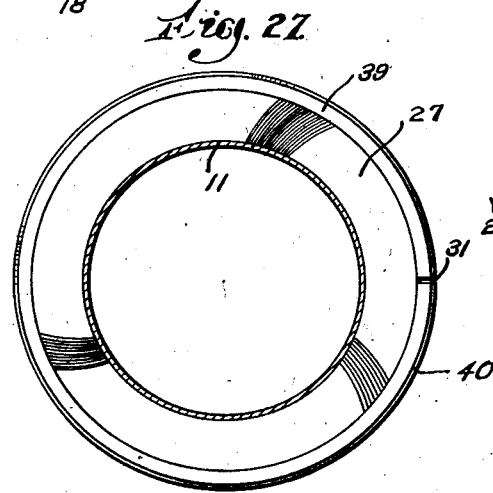
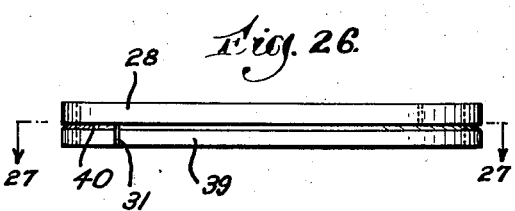
Inventor
Thomas A. Bowers
By Munro H. Hamilton
Attorney Patented Mar. 4, 1941

2,233,579

UNITED STATES PATENT OFFICE 2,233,579

FABRICATED PACKING

Thomas A. Bowers, Boston, Mass., assignor to Power Research Corporation, Boston, Mass., a corporation of Massachusetts Application March 26, 1938, Serial No. 198,263

10 Claims. (Cl. 309—44)

This invention relates to packing members, such as piston rings, intended generally to effect a seal between relatively reciprocating bodies, as in combustion motors, steam engines, pumps, compressors, and the like.

Objects of the invention are to provide an improved and a simple, efficient, cheap and durable sealing means; to develop in a sealing means a resilient radial wall pressure exerted uniformly around and against a cylinder periphery, which pressure is not limited to circumferential expansion of the entire sealing body and yet may be maintained at a substantially constant value at all points in the cycle of movement of a piston in its cylinder; to establish an optimum wall pressure value which will most advantageously combine satisfactory sealing of gases with provision for the occurrence of proper lubrication and dissipation of heat for minimizing frictional wear; to prevent fluctuation in wall pressure by protecting the sealing means from fluctuating pressures, such as pressures resulting from combustion gases, occurring in back of the sealing means and tending variably to expand such means against the cylinder; and generally to present gas sealing and oil control means having a very greatly increased operating life and a constant efficiency value at all times during the operating life.

The invention consists in means and combinations suitable for accomplishing the foregoing objects as explained in the following specification and includes not only the specific embodiments so described, but all substantial equivalents thereof within the scope of the appended claims.

The invention includes new structures for effecting a seal between reciprocating bodies. There is established and presented a packing in which occur what may be termed zones. In my co-pending application, Ser. No. 263,216 filed March 21, 1939, I have described and claimed a packing ring comprising an inner zone made up of an annular body presenting a substantially fixed perimeter, and an outer zone made up of a C-type piston ring or other body presenting a variable perimeter. Among the objects of the earlier application is that of substantially shutting out fluctuating gas pressures tending to force the packing against the cylinder with varying gas pressure intensities.

The present invention includes a structure directed to resisting or shutting out fluctuating gas pressure and also directed to providing a true radial expansibility in an integral packing body to take the place of expansibility obtained from increasing the width of the gap in a C-type ring. That is, the inner and outer perimeters of the packing ring itself are expansible and contractible relatively to each other. The spiral sheet structure illustrated in the accompanying drawings, and embodying one means of effecting a radially expansible zone, may take the place of the outer zone referred to in my co-pending application which may comprise a C-type piston ring presenting a variable perimeter.

The spiral sheet structure may also be utilized inside of C-type rings as illustrated in the drawings and described hereinafter, in which case it comprises an intermediate zone. The base, also referred to herein as the inner perimeter, for receiving the spiral sheet structure, may comprise the inner zone, being an annular body having a substantially fixed inner perimeter according to the principle of my co-pending application.

An important function of a structure for shutting out gas pressure is that of maintaining constant wall pressure values and overcoming wear. A sealing structure which does not exert a uniformly equal wall pressure all the way around a cylinder periphery, as for instance a C-type cast iron ring, may tend to wear the cylinder "egg-shaped" or out of round. Furthermore, if wall pressure is not maintained substantially uniform and independent of fluctuating gas pressures during the cycle of movement of a piston in its cylinder, the cylinder develops "tapered wear." That is, the cylinder wall is worn away in a tapered manner with the greatest amount of wear occurring at the top of that locus where the sealing member stops at the end of its compression stroke and where greatest gas pressure is present.

It has been found that the reason for the occurrence of "tapered wear" is almost entirely due to "back" pressure or that pressure resulting from gases passing around in back of a piston ring, tending to increase its circumferential length and force it outwardly against the cylinder wall with augmented wall pressure in varying degrees of intensity. The greatest pressure will occur when the piston is at or near the top of its stroke, where the gas pressure and the resistance of the piston are at a maximum. The gas pressure and piston resistance decrease as the latter moves down the cylinder and it has been shown by experimental test runs that the tapered wear is directly related to measured fluctuation of pressure.

It will be readily understood that tapered wear may be more pronounced in combustion motors from combustion gas pressures and the following description is particularly exemplary of sealing means for such motors. However, this is not done in any limiting sense with respect to other types of reciprocating bodies. I may apply the spiral structure or a similar one to other types of motors, as steam engines and compressors where sealing of "back" pressure is pertinent, or as a packing as for instance in pumps, stuffing boxes and the like. In the drawings illustrating the invention:

Figure 1 is a view showing in front elevation a sheet of material similar to sheets used in the construction of my improved sealing means;

Fig. 2 is a view in side elevation of a sheet similar to that shown in Fig. 1;

Fig. 3 is an elevational view fragmentarily illustrating a number of sheets mounted on a base;

Fig. 4 is a view similar to Fig. 3 and illustrates in broken lines the sheets provided with a spiral set, and the resulting change of dimension of the composite body formed therefrom;

Fig. 5 is an enlarged detail view of sheets similar to those shown in Figs. 3 and 4;

Fig. 6 is a plan view of a completed packing ring formed from sheets similar to those illustrated in Figs. 1-5 inclusive, and indicates the spiralled members in a fully compacted position, such as they would take in a forming die;

Fig. 7 is a view similar to Fig. 6; the ring is illustrated in its freely expanded state and the figure indicates a comparison of an expanded diameter with a compacted diameter as shown in Fig. 6;

Fig. 8 is an enlarged fragmentary view of a ring illustrating the freely expanded position when the desired spiralling has been effected and the ring is not in use;

Fig. 9 is a view similar to Fig. 8 and illustrates the ring in the position it assumes when it is in a fully compacted state as referred to and indicated in Fig. 6;

Fig. 10 is a view similar to Figs. 8 and 9 and illustrates the intermediate partly compacted position the ring assumes when mounted on a piston in a cylinder;

Fig. 11 is an enlarged fragmentary view of a ring showing in front elevation the edges of the sheets which contact the cylinder periphery, and as they appear in a freely expanded state as illustrated in Fig. 8;

Fig. 12 is a view similar to Fig. 11 and illustrates in front elevation a ring in a fully compacted state with the interstices entirely closed as illustrated in Fig. 9;

Fig. 13 is a view similar to Figs. 11 and 12 and indicates the relative size of the interstices when the spiral structure is in a position similar to that illustrated in Fig. 10;

Fig. 13a is a fragmentary view in front elevation of a modification of the sheet elements, the modification comprising a plurality of severed ends or radial members;

Fig. 14 is a fragmentary view in partial cross section illustrating a piston and cylinder with my improved ring mounted therein;

Fig. 15 is a view showing in central cross section one type of piston with a demountable head portion which may be used with my improved ring;

Fig. 16 is a view showing in central cross section a tapered die member which may be used for forming a ring of the sheet structure;

Fig. 17 is a plan cross section taken on the line 17—17 of Fig. 16;

Fig. 18 is a perspective view of the completed ring;

Fig. 19 is a detail cross section taken on the line 19—19 of Fig. 18;

Fig. 19a is a plan view of a ring of the character referred to, illustrating a modification of inner diameter or base structure;

Fig. 20 is a plan view of a modification comprising the piston ring shown in Figs. 1 to 19 inclusive in association with a conventional C-type cast iron ring;

Fig. 21 is a fragmentary elevational view of an assembly similar to that illustrated in Fig. 20 and indicating the composite sealing means in cross section;

Fig. 22 is a view in elevation of the packing ring shown in Figs. 20 and 21;

Fig. 23 is a view in elevation of a modified type of cast iron ring which may be used in the composite ring assembly shown in Figs. 20 to 22 inclusive;

Fig. 24 is another view in elevation showing a further modification of ring with which the composite structure shown in Figs. 20 to 22 inclusive may be employed;

Fig. 25 is a fragmentary view illustrating in cross section a still further modified type of sealing ring;

Fig. 26 is an elevational view of a complete ring similar to that fragmentarily indicated in Fig. 25; and Fig. 27 is a plan cross section taken on the line 27—27 of Fig. 26.

Referring more in detail to the drawings, 10 indicates a single sheet of material, a plurality of which sheets mounted on a base, in a spirally bent position, are made use of in forming a completed sealing member such as that illustrated in Figs. 6 and 7. These sheets may be of any material which is satisfactory for the particular packing use for which it is intended. For example, in forming a piston packing ring I may make use of a thin steel sheet. Other materials such as nickel, alloys and plastics may be employed. The size and shape of the sheets vary with the requirements of the ring proportions.

It is advantageous in making up a piston ring to provide a great many interstices or openings between sheets and to further this objective relatively thin sheets may be employed. As an instance of a desirable sheet thickness there may be cited a figure of .001 of an inch thickness which functions satisfactorily in rings having a diameter of from 3 to 6 inches. It should be understood that the thickness of the metal sheets will necessarily increase with increasing ring diameters, as for instance, with a 2½ or 3-foot ring diameter, the sheet thickness would increase to possibly .004 of an inch. With decrease of the ring diameter below 3 inches, it is contemplated that the sheet thickness may decrease to a figure of .001 inch and even with very little decrease in the ring diameter below the 3 to 6 inch diameter figure, a .0001 inch sheet thickness may be desirable.

One advantage, of those above referred to, is the resulting increased facilities for retaining oil films to be described hereafter. Another advantage is the flexibility in the wall pressure value attained. By employing thinner and more flexible metal sheets, the wall pressure may be reduced. Conversely by using thicker and stiffer sheets, the wall pressure may be increased. However, by proper selection of sheet thickness, an optimum wall pressure value may be arrived at for any given application.

A plurality of sheets similar to those illustrated in Figs. 1 and 2 are provided in some convenient manner as for instance by cutting them out of larger sheets of stock material or by stamping them out of a length of ribbon stock into a magazine. These sheets may then be associated together in various ways. For example, a straight length of material may be prepared by solidly mounting a plurality of the pieces on a base as 11, as by soldering or welding. If desired, the pieces may be grouped in an annular rack and soldered or welded together in this position, with some additional base means preferably being utilized, or no base may be used at all and the sheets may be secured one to another at their ends while grouped in the annular position referred to.

I have chosen to illustrate the sheets assembled on a base in a straight length as illustrated in Fig. 3. A length of material of a size determined by the diameter of the ring desired to be made may then be bent around to form a circular body as has been fragmentarily indicated in Fig. 4. The circular body so formed may be joined together at the ends to form an unbroken ring or may be left with the ends free, relative to which further discussion appears hereafter in this specification. The roughly assembled ring thus formed may then be placed in a die 12, illustrated in Fig. 16, which has its inner periphery tapered as indicated at 13. The ring is slightly rotated in this die whereby the sheets 10 are bent over into a spiral position such as is shown in Fig. 17 and the ring is then forced through the die 12 which sets the sheets in their spiralled formation and tends to decrease the radial width of the ring. Thereafter grinding or other well known finishing operations may be effected if desired.

It will be noted that the sheets 10 take their position in a ring in such a manner that the longer edges 23 comprise the top and bottom land surfaces of the ring. Those edges indicated at 24 will comprise the outer periphery of the ring or that surface which engages with the cylinder. Edges 25 will be united along the base 11 and together with the base comprise the inner diameter of the ring.

By giving the sheets 10 the spiral set referred to it may be readily seen that a substantial radial resiliency is developed between the inner perimeter and the outer perimeter of the ring. Fig. 4 indicates at the small arrows c and d the relative decrease in radial width which occurs when the sheets are bent over from a radial position to a spiralled position. Figs. 6–10 inclusive illustrate the changing sizes which may occur by varying the amount of spiral, and Figs. 8–10 inclusive particularly indicate the relative sizes the ring may have when: (a) in a free state (Fig. 8); (b) fully compressed in a forming die (Fig. 9); and (c) installed in a piston and cylinder (Fig. 10).

Attention is particularly directed to this radial resiliency or variability. It should be noted that the dimension of the outer perimeter of a length of this spiralled material may vary while the dimension of the inner perimeter remains relatively constant. It follows, therefore, that if the inner perimeter of a length of the material constitutes an unbroken circular body, i. e., if the base 11, which I have chosen as illustrative of one form of ring material, is solidly joined together at its ends, the outer perimeter of the ring may vary and the inner perimeter must remain at one fixed value. As a result, a structure made up of an inner zone and an outer zone is provided which is resilient to forces radially directed against the outer zone of the body but which is resistant to and substantially unchanged by all forces directed against the inner zone. If the structure is formed of sufficiently stiff sheets the outer zone may also be made to similarly resist forces from above occurring vertically of the zone.

Application of such a ring structure in a cylinder provides a resilient wall pressure uniformly distributed all the way around the cylinder, and the wall pressure yields to irregularities in the cylinder periphery without opening or closing of the ring itself; at the same time fluctuating pressures, such as of combustion gases, cannot expand the ring and thereby create variance in its wall pressure on the cylinder periphery.

It will be observed that a clearance space has been provided between the base 11, referred to as representative of any form of inner perimeter for the packing, and the piston groove. This enables the packing to function in a conventional manner relatively to the piston. That is, the piston is free to move in and around the packing, thereby minimizing the effect of "piston slap" tending to wear a cylinder out of round.

The spirally bent structure may also be helpful in further minimizing "piston slap" by using up some of the force of the "piston slap" in bending the spiral leaves as contrasted with such a force being directly transmitted through a solid ring body on to the cylinder periphery.

The inner zone of a ring of this type may be fixed in various ways. If a base such as 11 is utilized, the ends of the base may be joined together, for instance, by welding as already described. Mechanical joining means may obviously be resorted to and similarly the ends of rings of the type referred to, other than those utilizing a base 11, may be solidly fixed together.

I may, however, desire to utilize these rings in a broken as well as an unbroken circular state, since some of the fluctuating force tending variably to force a ring against its cylinder wall may, to a certain extent as described, be absorbed by the radial resiliency inherent in the ring whether it is fixed at its inner perimeter or not.

Also I may desire to employ a modification of inner perimeter, as for example a structure similar to that illustrated in Fig. 19a. This structure constitutes a substantially fixed inner perimeter 11a, and is made up of a plurality of thin resilient members as 11b, 11c, and 11d, nested one within the other. These resilient members 11b, 11c and 11d are broken at the points, 11e, 11f and 11g respectively, and the breaks occur out of alignment with one another. The composite body presents a certain amount of yieldability which may be limited in varying ways, one example being to utilize the friction of the members upon each other.

It is pointed out that such a structure, while not completely fixed and entirely shutting out "back" pressure, is exemplary of a means of limiting fluctuating pressure on the back of a ring to such a value that when transmitted through the ring structure onto the cylinder periphery, the pressure may have little or no effect. This composite structure of Fig. 19a is intended to be illustrative of any suitable means of limiting undesirable pressure transmission upon a cylinder periphery as embraced in the term "substantially fixed inner perimeter" and employed in the specification and claims.

The spiral construction is effected by bending the sheets 10 over upon themselves with the inner ends being held in a fixed position so that the sheets extend radially outward for a distance. As a result of this formation, the ends of the spirally bent portions of the sheets are angularly presented to the cylinder periphery. This may be more clearly understood by reference to Fig. 4 in which it will be noted that the thickness of the end 24 of any one of the sheets, measured squarely thereacross, is its smallest dimension. If this end is laid over and presented to a cylinder periphery at any angle, a new and relatively larger end dimension may be present such as the edge 24a shown in broken lines in Fig. 4. Such an edge as 24a may, for example, result from the action of the tapered forming die shown in Fig. 16. The sheets therefore are presented, and tend to wear, along this greater dimension when in the spirally bent position. Each sheet acts somewhat like a lever being held at its inner end and tending to spring outward to a degree determined by the spiral set given.

The point of leverage may be carried outward by forming the inner ends of the sheets in a wedge-shaped manner as indicated at 21 and emphasized in enlarged detail in Fig. 5 by dimensional arrows a and b. It will be noted that with such a construction the inner ends are tightly contacting one another a part of the way out, and the leverage point will then occur at the point where this contact ends. The result of this is to effect a shorter and consequently stiffer bending action so that a less yieldable flexibility ensues.

Further modification in the application and construction of the spirally bent material may be desirable. For example, I may prefer to use the material for other purposes such as for a force-absorbing body, and associate the sheets in a spaced-apart relation, or I may prefer to use groups of sheets occurring at intervals.

The sheets themselves may be modified in construction as for example in Fig. 13a. I have shown each sheet divided up into fine strips 10a, all of which have their outer ends free to contact against a cylinder periphery and are solidly mounted at the inner ends as above described.

In place of the sheets cited, fine bristle-like elements may be employed, of any suitable cross section, which may function in the same manner as the sheets or the sheet strips.

It is pointed out that with all of the spirally bent elements shown or referred to, a common principle is in effect. That is to say, the contacting ends such as have been denoted by the numeral 24 occupy a given amount of space on the cylinder periphery. Therefore, whether pressure is shut out from between the leaves or not, it cannot be effective on those areas of the cylinder covered by these ends 24. As a result, by increasing the area of the contacting ends on a cylinder periphery, it is possible to limit that space on the periphery against which pressure can be exerted.

In Fig. 4 the relative expansibility of the inner and outer perimeters of the ring is more clearly indicated by the broken line showings of the ring in succeedingly smaller compacted positions. It will also be observed that the interstices 20 grow smaller as the sheets are spiralled further so that substantial elimination of undesirable interstice width is effected.

The spirally-bent structure retains oil films in the interstices 20 between the sheets. These oil films efficiently resist gases tending to be forced therethrough with the result that the spirally-bent structure comprises a body substantially impervious to flow of gases.

If the inner circumference of a ring is maintained as a zone comprising a substantially unyielding circle and cannot be increased by expanding, no back pressure effect can be transmitted by the ring to the cylinder, and all sealing pressure must come from changes in the radial width between the inner and outer circumferences of the ring and not from changes in its inner circumference. The present structure embodies the principle of radial flexing in the body of the ring and not from spreading the ring as a whole.

A very definite advantage ensuing from the radial resiliency created by the spiral structure is the reaction of the ring to wear along its outer periphery. As the ends of the spiral sheets in contact with a cylinder periphery wear, the sheets tend to flex outwardly to that position from which they were compacted to fit in the cylinder and the efficiency and value of the ring wall pressure is maintained substantially constant. This characteristic, being derived from the spiral structure, obtains to some extent whether or not the ring has a fixed inner circumference.

Fig. 15 is illustrative of a means of installing a ring of unbroken inner perimeter and comprises the provision of a piston with a special removable head portion in which the detachable portion 17 is secured to a body and skirt portion 18 by means of bolts or rivets 19. Other types of piston head designs particularly adapted for use with the present type of packing have been illustrated and described in my co-pending application referred to above.

A substantially unbroken perimeter structure is readily arrived at by joining the ends after installation by mechanical means, in which case a conventional piston may be utilized.

As stated above, the spirally-bent sheet structure, instead of comprising the outer zone of a packing, may be combined with other ring bodies, in which case this sheet structure becomes an intermediate zone.

In Figs. 20 to 27 inclusive, I have illustrated a spiral structure similar to that indicated in Figs. 1 to 19 inclusive, and about this structure may be positioned means for engaging the inner periphery of a cylinder. Such means may comprise one or more rings of varying types well known in the art. For instance in Figs. 20, 21 and 22, I have shown two conventional C-type cast iron rings 28 and 29 whose combined vertical height is equal to the vertical height of the spiral structure. An important advantage resulting from this composite assembly is that the gaps 30 and 31 may be so positioned with relation to one another that each ring seals the gap of the other and if desired the two rings may be secured to one another as by pinning in some desirable position where this is accomplished.

It is pointed out that the advantage of using the spiral structure is not, however, limited to two outer rings since even with one ring and an open gap greatly improved sealing action is obtained. Other types of rings such as those disclosed in my earlier Patent No. 2,076,544 may be used in place of the C-type rings referred to, and also I may desire to employ one or more rings occurring in sections rather than one complete length.

In Figs. 23 and 24, I have illustrated modified C-type rings which may be used in place of either rings 28 or 29 or both. These comprise a ring 32 (Fig. 23) cast in a reduced circular dimension with one end 33 overlapping the other 34. Also a ring 35 (Fig. 24) with ends 36 and 37 overlapping radially of the ring. Either of these rings when stretched over a piston and about the spiral structure 27 tends to shrink and cling to the spiral structure.

When associated with rings similar to those described, the spiral structure operates in much the same manner as before and comprises an intermediate zone in the packing. This intermediate zone acts as an expansible member adapted to present the outer rings in a resilient manner against the cylinder periphery. It also effects improved sealing between itself and the outer ring or rings preventing the entrance of fluctuating gas pressures therebetween.

It is pointed out that when the spiral structure is surrounded by these rings, it may become shortened radially of the ring, and the resulting spaces or interstices are relatively smaller, which results in its becoming possible to use a thicker metal for the sheets. This may be highly advantageous in the construction of the spiral body. Likewise with the shortened spiral structure, the spiral body is wholly received on a surface of the piston groove, there is less tendency for gases to pass through the structure, and a thicker sheet dimension may also be resorted to for this reason.

Figs. 25 to 27 inclusive illustrate a packing ring of the same general character as that shown in Figs. 20 to 22 inclusive. Specifically, this packing ring is intended to be used as an oil ring or a compression ring and oil ring in one. Due to "back" pressure set up by fluctuating combustion pressures, it is now difficult to effect sealing of combustion gases, and proper distribution of oil films on a cylinder wall and piston ring, with the same ring. Trouble usually occurs from the ring being pressed too tightly against the cylinder during the operation of its stroke so that no oil for lubricating purposes is left, or else the oil film becomes so thin that the hot gases burn the oil and quickly wear away the cylinder. By the means I have provided as above described, such a condition is almost entirely eliminated and either the spiral structure alone or any association with one or more outer rings may comprise a satisfactory compression ring and oil ring at the same time.

However, a further modification consists in forming rings of the character referred to in Figs. 1 to 20 inclusive, and 20 to 22 inclusive, with special oil handling structure and this may be effected by several means, as for instance in Figs. 25, 26 and 27, the lower ring 39 is formed with a beveled face 40 occurring adjacent the under side of ring 28. It will be observed that when the ring is in a cylinder, there results a reservoir of oil to be held and distributed along the cylinder as the piston rises upward, this space occurring all the way around the ring as shown in Figs. 26 and 27. On the down stroke of the piston, the upper ring 28 presents a sharp edge or corner 41, which then effects the necessary scraping generally effected by the conventional oil ring.

No substantial passing of combustion gases can occur as, for instance, through the top gap 30 and thence around the shouldered edge 40 and through gap 31, the reason being that the oil occurring in the reservoir so formed almost entirely prevents any passage of gas therealong. It may readily be seen that the specific beveled edge 40 shown in Figs. 25 to 27 inclusive is illustrative of various recessed conditions occurring in one or the other of the rings, and I may wish to form one or more of the rings in varying manners adapted to present a space for oil to be collected, and a sharp wiping edge.

It will thus be seen that with a ring of this construction, a wall pressure is possible which is uniform all the way around a cylinder periphery and is maintained constantly uniform for any position in the piston cycle. Several benefits accrue from this uniformly maintained pressure. Tapered wear and to some extent "out of round" wear are eliminated or minimized and with them the occurrence of "blow-by" or the passage of gases by the seal. Separate oil rings necessitated by the non-uniform pressures of a conventional compression ring are not necessary and improved oil control can be had with a single ring of the present type as compared with new installation of the old type. Greater efficiency at all times, increased operating life and more economical performance are had.

Having thus described my invention, what I claim is:

1. A packing ring comprising a composite annular body made up of a plurality of resilient sheets disposed upon their edges and having their inner ends secured together to form a fixed inner perimeter for the ring.

2. A packing ring comprising a plurality of resilient sheets closely compacted and secured together at their inner ends, said sheets being spirally bent to form a radially compressible annular body.

3. A packing ring formed from a plurality of resilient sheets bent over upon one another to comprise an annular body, the inner ends of said sheets being associated together to comprise a fixed inner perimeter of said ring, and the outer ends of the said sheets being free to flex upon one another whereby a radially compressible body portion is effected.

4. A packing ring for a piston and cylinder comprising a plurality of resilient sheets on edge and closely compacted together and bent over upon one another, a base member secured to the inner ends of said sheets and effecting a fixed inner perimeter for said ring, the outer ends of said sheets occurring free and said sheets being adapted to flex upon one another and provide radial compressibility in the body of the ring.

5. In combination a piston having a groove therein, a piston ring in said groove, a substantially continuous ring body having a fixed perimeter, said continuous ring body connected to the inner periphery of the piston ring and adapted to maintain the inner perimeter of the piston ring constant, said piston having a detachable head for mounting the continuous ring body in the piston groove, said piston ring comprising a radially resilient intersticed structure.

6. A piston ring construction for use in a piston groove comprising a flexible piston ring mounted in the groove, concentric annular bodies associated with the said piston ring at the inner periphery thereof adapted to limit gas pressure on the ring, and said piston ring consisting of a plurality of resilient sheets secured together at their inner ends.

7. A packing for a piston and cylinder comprising a ring member of fixed perimeter adapted to be loosely mounted around said piston, a sealing body fabricated from layers of sheet metal solidly secured at their inner ends to said ring, said sealing body being radially contractible and extensible.

8. A packing ring comprising a plurality of resilient sheets compacted together to form an annular body, said sheets being secured together at their inner ends by means of a continuous ring member to provide a substantially fixed perimeter for the said packing ring.

9. A packing ring comprising a plurality of resilient strips bent over upon one another to comprise an annular body, the inner ends of said strips being secured on a base to comprise a fixed inner perimeter for the ring.

10. A piston ring construction for use in a piston groove comprising a radially expansible annular body fabricated of a plurality of resilient sheets, a continuous ring member of fixed perimeter secured to the inner periphery of the flexible body in spaced relation to the back of said groove, and said continuous ring member adapted to maintain the inner perimeter of the flexible body in a fixed state.

THOMAS A. BOWERS.